(12) United States Patent
Cali et al.

(10) Patent No.: US 11,812,777 B2
(45) Date of Patent: Nov. 14, 2023

(54) AEROSOL-GENERATING DEVICE COMPARATOR

(71) Applicant: Philip Morris Products S.A., Neuchatel (CH)

(72) Inventors: Ricardo Cali, Mannheim (DE); Pierre Herve, Neuchatel (CH); Danny Hirdes, Wedel (DE); Andreas Loeb, Mannheim (DE); Joern Patscher, Wedel (DE); Fabrice Teseo, Neuchatel (CH); Johan Valette, Neuchatel (CH); Jan Verbeeck, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 331 days.

(21) Appl. No.: 17/311,836

(22) PCT Filed: Dec. 11, 2019

(86) PCT No.: PCT/EP2019/084759
§ 371 (c)(1),
(2) Date: Jun. 8, 2021

(87) PCT Pub. No.: WO2020/120632
PCT Pub. Date: Jun. 18, 2020

(65) Prior Publication Data
US 2022/0015412 A1    Jan. 20, 2022

(30) Foreign Application Priority Data
Dec. 13, 2018   (EP) .................................... 18212286

(51) Int. Cl.
*A24C 5/34*    (2006.01)
*A24F 40/80*   (2020.01)
*G01N 1/24*    (2006.01)

(52) U.S. Cl.
CPC ................ *A24C 5/34* (2013.01); *A24F 40/80* (2020.01); *G01N 1/24* (2013.01)

(58) Field of Classification Search
CPC .............. A24C 5/34; A24F 40/80; G01N 1/24
(Continued)

(56) References Cited

U.S. PATENT DOCUMENTS

| 4,819,665 A * | 4/1989 | Roberts .................... A24D 1/22 |
| | | 131/194 |
| 5,117,845 A | 6/1992 | Poulet et al. |

(Continued)

FOREIGN PATENT DOCUMENTS

| CN | 201555749 U |   | 8/2010 |
| CN | 201555749 U | * | 8/2010 |

(Continued)

OTHER PUBLICATIONS

Phillip Morris International, https://www.pmi.com/smoke-free-products/heated-tobacco-products, Jan. 2023, 12 pg(s) (Year: 2023).*

(Continued)

*Primary Examiner* — Stephanie E Bloss
*Assistant Examiner* — Kevin C Butler
(74) *Attorney, Agent, or Firm* — Oblon, McClelland, Maier & Neustadt, L.L.P.

(57) ABSTRACT

An apparatus is provided, including: a housing; a first assessment section defining a first airflow pathway and including a first conduit including inlet and outlet ends, the inlet end to receive a mouth end of an aerosol-generating system or a smoking article, a first pump in fluid communication with the first conduit outlet end and to draw fluid through the first conduit from the inlet end to the outlet end, and a first cover arranged on the housing; and a second assessment section defining a second airflow pathway and including a second conduit including inlet and outlet ends, (Continued)

the inlet end to receive a mouth end of an aerosol-generating device or a smoking article, a second pump in fluid communication with the second conduit outlet end and to draw fluid through the second conduit from the inlet end to the outlet end, and a second cover arranged on the housing.

15 Claims, 6 Drawing Sheets

(58) Field of Classification Search
USPC .......................................................... 73/23.2
See application file for complete search history.

(56) References Cited

U.S. PATENT DOCUMENTS

| | | | | |
|---|---|---|---|---|
| 2009/0044818 | A1* | 2/2009 | Takeuchi | A24D 1/22 131/334 |
| 2013/0037041 | A1* | 2/2013 | Worm | A24F 40/46 131/329 |
| 2013/0160781 | A1* | 6/2013 | Payne | A24F 13/00 131/330 |
| 2014/0283860 | A1* | 9/2014 | Stolz | A24B 15/165 131/330 |
| 2014/0300480 | A1* | 10/2014 | Xiang | A24F 40/80 356/439 |
| 2014/0345633 | A1* | 11/2014 | Talon | A24F 40/53 702/30 |
| 2014/0356607 | A1* | 12/2014 | Woodcock | A24D 1/22 427/430.1 |
| 2015/0040924 | A1* | 2/2015 | Mironov | A24D 1/22 131/328 |
| 2015/0359264 | A1* | 12/2015 | Fernando | H01J 49/0036 250/281 |
| 2019/0090533 | A1* | 3/2019 | Norfleet | A24D 1/20 |
| 2020/0093185 | A1* | 3/2020 | Lim | A24F 40/51 |
| 2020/0316325 | A1* | 10/2020 | Reevell | A24F 40/53 |
| 2021/0045450 | A1* | 2/2021 | Lomas | A24F 40/10 |
| 2022/0015412 | A1* | 1/2022 | Cali | A24F 40/80 |

FOREIGN PATENT DOCUMENTS

| | | | | |
|---|---|---|---|---|
| CN | 104568954 | A | | 4/2015 |
| CN | 104568954 | A | * | 4/2015 |
| CN | 105122039 | A | * | 12/2015 ........... A24C 5/3406 |
| CN | 205785966 | U | * | 12/2016 |
| CN | 205785966 | U | | 12/2016 |
| CN | 107727804 | A | * | 2/2018 ............. G01D 21/02 |
| CN | 107727804 | A | | 2/2018 |
| CN | 207964781 | U | | 10/2018 |
| CN | 207964781 | U | * | 10/2018 |
| CN | 113163879 | A | * | 7/2021 ............... A24C 5/34 |
| EP | 1 702 522 | A1 | | 9/2006 |
| EP | 3 287 762 | A1 | | 2/2013 |
| EP | 3 085 250 | A1 | | 10/2016 |
| EP | 3085250 | A1 | * | 10/2016 ........... A24C 5/3406 |
| EP | 3085251 | A1 | * | 10/2016 ........... A24C 5/3406 |
| EP | 3 013 161 | | | 3/2018 |
| JP | 7066633 | B2 | * | 5/2022 ............... A24D 1/20 |
| RU | 113 582 | U1 | | 2/2012 |
| RU | 113582 | U1 | * | 2/2012 |
| SU | 913 151 | A1 | | 3/1982 |
| SU | 913151 | A1 | * | 3/1982 ............... G01N 7/08 |
| WO | WO-2014206934 | A1 | * | 12/2014 ............... A24C 5/34 |
| WO | WO 2017/140740 | A1 | | 8/2017 |
| WO | WO-2017207442 | A1 | * | 12/2017 ............... A24D 1/20 |
| WO | WO-2018216961 | A1 | * | 11/2018 ............. A24B 15/16 |
| WO | WO-2019211337 | A1 | * | 11/2019 ............... A24D 3/17 |
| WO | WO-2020120632 | A1 | * | 6/2020 ............... A24C 5/34 |

OTHER PUBLICATIONS

Tariq A. Bhat PhD et al., Acute Effects of Heated Tobacco Product (IQOS), Nicotine & Tobacco Research, 2021, 1160-1167 (Year: 2021).*

Comparison Vitrocell® Smoking Machines, Retrieved from the Internet: URL: https://www.vitrocell.com/inhalation-toxicology/smoking-machines/comparison-smoking-machines. Retrieved Aug. 24, 2021, 3 pages.

IQOS, Retrieved from the internet: URL: https://www.youtube.com/watch?v=kPmzcx70woY&t=5s, uploaded to YouTube on Mar. 29, 2016, 1 page.

International Search Report and Written Opinion dated Mar. 19, 2020 in PCT/EP2019/084759 filed Dec. 11, 2019.

Combined Russian Office Action and Search Report dated Mar. 28, 2023 in Russian Patent Application No. 2021118059/03 (with English Translation), 13 pages.

* cited by examiner

AEROSOL-GENERATING DEVICE COMPARATOR

The present invention relates to an apparatus or system for comparing the aerosol generated by an aerosol-generating device to the smoke generated a smoking article or the aerosol generated by another aerosol-generating device.

Alternative products to conventional smoking articles, such as cigarettes and cigars, have been developed. Recent developments have resulted in alternative products which generate a nicotine containing aerosol with a taste that can satisfy existing smokers. One such alternative product comprises tobacco containing articles having a similar form to conventional cigarettes, which are inserted into in a device with an electric heater and heated to a temperature below the combustion temperature of tobacco. Another such alternative product comprises a nicotine containing liquid which is heated in a device by an electric heater to generate a nicotine containing aerosol.

The composition of the aerosol generated by some of the new aerosol-generating products and systems can differ significantly from the composition of the smoke generated by conventional smoking articles, such as cigarettes and cigars. The new alternative products can generate a nicotine containing aerosol without the levels of tobacco combustion products that are present in the smoke generated by conventional smoking articles. For example, the alternative products can generate and aerosol with a significantly reduced amount of smoke condensate, the part of the smoke of a cigarette which can be retained in a trap of a smoking machine, compared to the smoke generated by conventional smoking articles.

Conventional smoking articles generate both mainstream smoke, which is the smoke directly inhaled by the user, and sidestream smoke, which is the smoke released from the lit end that is not directly inhaled by the user. Some of the new aerosol-generating products and systems can provide an alternative product which generates significantly reduced amounts of sidestream aerosol compared to the sidestream smoke generated by conventional smoking articles. In some new aerosol-generating products and systems, no detectable sidestream aerosol is generated at all.

It would be desirable to enable a smoker to compare the smoke generated by a conventional smoking article to the aerosol generated by an aerosol-generating system. It would be particularly desirable to enable a smoker to visually compare the smoke from a conventional smoking article to the aerosol generated by an aerosol-generating system. It would also be desirable to enable a comparison between the aerosols generated by two aerosol-generating devices.

According to a first aspect of the present invention, there is provided an apparatus comprising: a housing; a first assessment section defining a first airflow pathway; and a second assessment section defining a second airflow pathway. The first assessment section comprises: a first conduit comprising an inlet end and an outlet end, the inlet end being arranged to receive a mouth end of an aerosol-generating system or a smoking article; a first pump in fluid communication with the outlet end of the first conduit and arranged to draw fluid through the first conduit, from the inlet end to the outlet end; and a first cover arranged on the housing, the first cover and the housing together forming a first chamber, the first chamber enclosing the inlet end of the first conduit and an aerosol-generating article or smoking article received in the inlet end of the first conduit. The second assessment section comprises: a second conduit comprising an inlet end and an outlet end, the inlet end being arranged to receive a mouth end of an aerosol-generating device or a smoking article; a second pump in fluid communication with the outlet end of the second conduit and arranged to draw fluid through the second conduit from the inlet end to the outlet end; and a second cover arranged on the housing, the second cover and the housing together forming a second chamber, the second chamber enclosing the inlet end of the second conduit and an aerosol-generating article or smoking article received in the inlet end of the second conduit.

The apparatus of the present invention comprises two assessment sections. Providing an apparatus with two assessment sections enables the apparatus to provide a comparison between the output of one smoking article or aerosol-generating device with the output of another smoking article or aerosol-generating device. It is envisaged that an apparatus of the present invention may have two or more assessment sections. For example, the apparatus may have three assessment sections and may be able to compare the output of three smoking articles or aerosol-generating devices.

Each assessment section of the present invention comprises: a conduit comprising an inlet end and an outlet end, the inlet end being arranged to receive a mouth end of an aerosol-generating system or a smoking article; and a pump in fluid communication with the outlet end of the conduit and arranged to draw fluid through the conduit from the inlet end to the outlet end. Accordingly, each assessment section comprises equipment for drawing the output of an aerosol-generating article or smoking article air through an airflow pathway from the inlet end of the conduit to the outlet end of the conduit.

Each assessment section of the present invention further comprises a cover arranged on the housing, the cover and the housing together forming a chamber. The chamber encloses the inlet end of a conduit and an aerosol-generating article or smoking article received in the inlet end of the conduit. The chamber and the housing may form a substantially gas tight chamber. In other words, gases may be substantially prevented or inhibited from exiting or entering the chamber through the housing and the cover. Enclosing the inlet end of the conduit and an aerosol-generating article or smoking article received in the inlet end of the conduit in a chamber may enable the apparatus to capture any sidestream smoke emitted from a smoking article or any sidestream aerosol emitted from an aerosol-generating system. This may substantially prevent or inhibit sidestream smoke or sidestream aerosol from being released from the apparatus during use. This may also enable the apparatus to be used in areas in which it is prohibited to smoke a smoking article or use an aerosol-generating device.

The cover may be any suitable type of cover or canopy that is arrangeable with the housing to form a chamber. The cover may be connected or secured to the housing. In some embodiments, the cover may be hingedly connected to the housing. In some embodiments, the cover may be releasably secured to the housing. The cover may be releasably secured to the housing by any suitable means. For example, the cover may comprise one or more latches and the housing may comprise one or more hooks arranged to engage the latch of the cover when the cover is arranged in position over the housing.

A seal may be provided at the interface between the cover and the housing. The seal may be a substantially impervious to gases. The seal may be a hermetic seal. In some embodiments the housing may comprise the seal. In some embodiment the cover may comprise the seal.

Preferably, the cover of each assessment section is formed from a substantially transparent material. Advantageously, forming the cover from a substantially transparent material may enable an observer to view an aerosol-generating device or smoking article held in the chamber. In particular, forming the cover from a substantially transparent material may enable an observer to view any sidestream output generated from an aerosol-generating device or a smoking article.

The cover may be formed from any suitable material. For example, the cover may be formed from a plastics material or glass.

The cover may be any suitable shape. In some preferred embodiments, the cover is substantially cuboidal. Where the cover is formed from substantially transparent material, the cover may be substantially cuboidal and comprise one or more inclined, sloped or bevelled portions to provide an observer looking down on the apparatus, from the side, with a view of an aerosol-generating system or cigarette received in the inlet end of the conduit that is not obstructed or warped by a corner of the cover.

The apparatus may further comprise one or more air quality sensors.

In some embodiments, the apparatus may comprise a first air quality sensor arranged to sense air quality in the first chamber. The first air quality sensor may be arranged in the first chamber. In some embodiments, the apparatus may comprise a second air quality sensor arranged to sense air quality of the second chamber. The second air quality sensor may be arranged in the second chamber. Arranging an air quality sensor in the chamber of an assessment section may enable the apparatus to monitor the composition and amount of sidestream output of an aerosol-generating system or a smoking article received in the chamber.

In some embodiments, the apparatus may further comprises an air quality sensor in the first conduit. In some embodiments, the apparatus may further comprises an air quality sensor in the second conduit. Arranging an air quality sensor in the conduit of an assessment section may enable the apparatus to monitor the composition and amount of mainstream output of an aerosol-generating system or a smoking article received in the inlet end of the conduit.

As used herein, the term "air quality sensor" is used to refer to a sensor that is configured to sense one or more properties of the air in the vicinity of the sensor. In particularly preferred embodiments of the invention, the air quality sensor is configured to sense one or more of: carbon monoxide; volatile organic compounds; humidity, in particular relative humidity; carbon dioxide; fine particulate matter; nitrogen dioxide; dioxygen; and pressure.

The air quality sensor may comprise one or more gas sensors for detecting the presence of one or more gases in the environment around the system. In particular, the one or more gas sensor may be configured to detect the concentration of one or more gases in the air surrounding the sensor.

Preferably, the one or more gas sensors may be configured to sense one or more of: carbon monoxide, volatile organic compounds, carbon dioxide; nitrogen dioxide; and dioxygen. Preferably, the aerosol-generating system comprises an air quality sensor configured to sense carbon monoxide in the air surrounding the sensor.

The one or more gas sensors may be any suitable type of gas sensor. Suitable types of gas sensor include: electrochemical gas sensors, such as chemical field-effect transistors; chemical resistive sensors; metal oxide semiconductor (MOS) sensors; catalytic sensors (pellistors); microcantilever array sensors; surface acoustic wave (SAW) sensors; photoionization detectors (PIDs); and infrared sensors.

Some exemplary suitable gas sensors which are currently available include: SGP30 and SGPC3 from Sensirion AG; CDM7160-000 and TGS2602 from FIGARO USA., INC; and MiCS-VZ-89TE from SGX Sensortech Limited.

The air quality sensor may comprise one or more sensors for sensing volatile organic compounds (VOCs). As used herein, the term "organic compound" means any compound containing at least the element carbon and one or more of hydrogen, halogens, oxygen, sulphur, phosphorus, silicon or nitrogen, with the exception of carbon oxides and inorganic carbonates and bicarbonates. As used herein, the term "volatile organic compound (VOC)" means any organic compound having at 293.15 Kelvin (K) a vapour pressure of 0.01 kilopascal (kPa) or more, or having a corresponding volatility under the particular conditions of use. The definitions of "organic compound" and "volatile organic compound" used herein are taken from directive 2010/75/EU of the European parliament and of the council of 24 Nov. 2010 on industrial emissions (integrated pollution prevention and control).

The one or more volatile organic compound sensors may be any suitable type of sensor. For example, suitable VOC sensors include: electrochemical gas sensors, such as chemical field-effect transistors; chemical resistive sensors; metal oxide semiconductor (MOS) sensors; catalytic sensors (pellistors); microcantilever array sensors; surface acoustic wave (SAW) sensors; photoionization detectors (PIDs); and infrared sensors.

Some exemplary suitable VOC sensors which are currently available include: SGP30 and SGPC3 from Sensirion AG; TGS2602 from FIGARO USA., INC; and MiCS-VZ-89TE from SGX Sensortech Limited.

The air quality sensor may comprise one or more humidity sensors. As used herein, the term "humidity" may refer to absolute humidity, relative humidity or specific humidity. As used herein, the term "absolute humidity" refers to the mass of water vapour in a unit volume of air, which may be expressed in grams per cubic meter. As used herein, the term "relative humidity" refers to the ratio of the actual vapour density and the saturation vapour density at a given temperature, which may be expressed as a percentage. Put in another way, the term "relative humidity" refers to the ratio of the partial pressure of water vapour in a mixture at a given temperature to the equilibrium vapour pressure of water over a flat surface of pure water at that given temperature. As used herein, "specific humidity" refers to the ratio of the mass of water vapour to the total mass of the mixture of water vapour and air, which may be expressed in grams of vapour per kilogram of air.

The one or more humidity sensors may be any suitable type of sensor. For example, suitable humidity sensors include: capacitive humidity sensors; resistive humidity sensors; and thermal conductivity based humidity sensors.

Some exemplary suitable humidity sensors which are currently available include: SHT3x, SHTW2, SHTC3 and SHT7x humidity sensors from Sensirion AG.

The one or more humidity sensors may be combined with one or more temperature sensors. In particular, where the one or more humidity sensors are configured to sense the relative humidity of the air in the vicinity of the aerosol-generating system, the one or more humidity sensors also comprise a temperature sensor. The one or more temperature sensors may be any suitable type of temperature sensor, such as: bandgap temperature sensors; resistance temperature detectors (RTDs); thermocouples; thermistors, particularly negative temperature coefficient (NTC) thermistors; and semiconductor temperature sensors.

The air quality sensor may comprise one or more sensors configured to sense fine particulate matter in the air in the vicinity of the aerosol-generating system. As used herein, the term "fine particulate matter" refers to particles and suspended in the air in the vicinity of the aerosol-generating system. In particular, particulate matter comprises inhalable particles, with diameters that are generally 10 micrometres and smaller (PM10) and fine inhalable particles, with diameters that are generally 2.5 micrometres and smaller (PM2.5).

More specifically, as used herein, fine particulate matter includes PM10, which refers to particulate matter which passes through a size-selective inlet with a 50% efficiency cut-off at 10 μm aerodynamic diameter. The reference method for the sampling and measurement of PM10 is that described in EN 12341:1999 'Air Quality—Determination of the PM10 fraction of suspended particulate matter—Reference method and field test procedure to demonstrate reference equivalence of measurement methods'. As used herein, fine particulate matter also includes PM2.5, which refers to particulate matter which passes through a size-selective inlet with a 50% efficiency cut-off at 2.5 μm aerodynamic diameter. The reference method for the sampling and measurement of PM2.5 is that described in EN 14907:2005 'Standard gravimetric measurement method for the determination of the PM2.5 mass fraction of suspended particulate matter'. The definitions of PM10 and PM2.5 used herein are taken from Directive 2008/50/EC of the European Parliament and of the Council of 21 May 2008 on air quality and cleaner air for Europe.

The one or more fine particulate matter sensors may be any suitable type of particulate matter sensor, such as: resistive particulate matter sensors; thermophoretic particulate matter sensors; laser-based light scattering particulate matter sensors.

The air quality sensor may comprise one or more pressure sensors. Pressure readings may be particularly advantageous in combination with humidity and temperature readings, as the combination of humidity, temperature and pressure readings may improve the reliability of the humidity determination.

The one or more pressure sensors may be any suitable type of pressure sensor, such as: capacitive pressure sensors; piezoelectric pressure sensors; and piezoresistive pressure sensors. The one or more pressure sensors may be absolute pressure sensors or differential pressure sensors.

The one or more air quality sensors may comprise at least one of: an electrochemical sensor; a chemical resistive sensor; a Metal Oxide Semiconductor (MOS) sensor; a catalytic sensor; and a mass spectrometer.

The one or more air quality sensors may be electromechanical devices. The one or more air quality sensors may be any of: a mechanical device, an optical device, an opto-mechanical device and a microelectromechanical systems (MEMS) based sensor. Preferably, the one or more air quality sensors are microelectromechanical systems (MEMS) based sensors.

In some embodiments, a chamber of an assessment section may comprise an outlet for exhausting gas from the chamber to the ambient environment. The first chamber may comprise a first outlet in at least one of the first cover and the housing. The second chamber may comprise a second outlet in at least one of the second cover and the housing.

In some embodiments comprising an air quality sensor, the air quality sensor may be arranged at the outlet or in a conduit of the outlet. In embodiments comprising an air quality sensor within the chamber, the outlet may be spaced at a distance from the air quality sensor and an aerosol-generating article or smoking article received in the chamber. This may enable sidestream output from an aerosol-generating article or smoking article within the chamber to be exhausted from the chamber through the outlet after flowing over the air quality sensor within the chamber.

In some embodiments, an outlet in a chamber may comprise a valve. The valve may be operable to close the outlet to substantially prevent gases within the chamber from leaving the chamber through the outlet. The valve may be operable to open the outlet to enable gases within the chamber from leaving the chamber through the outlet. In some embodiments, a valve may be manually operable by an operator of the apparatus, for example, by pressing a button or operating a lever arranged on the housing. In some embodiments, the valve may be controlled by a controller or a control system. Where a valve is controlled by a controller or a control system, the valve may be automatically controlled as part of a predetermined or preprogramed operation or may be operated by an operator at a user interface. The first chamber may comprise a first outlet and a first valve operable to open and close the first outlet. The second chamber may comprise a second outlet and a second valve operable to open and close the second outlet.

In some particular embodiments, a chamber may comprise an active exhaust system. In other words, a chamber may comprise an outlet and a supply of air from a pump for driving gases within the chamber out of the outlet. This may enable the apparatus to actively flush gases from a chamber of an assessment section. In some embodiments, the pump of the active exhaust system may be the pump for drawing air through the conduit of the assessment section. In some embodiments, the pump may be a different pump to the pump for drawing air through the conduit of the assessment section. The pump of the active exhaust system may be controlled manually by an operator of the apparatus or may be controlled by a controller or a control system of the apparatus. An active exhaust system may also comprise a valve operable to open and close the outlet. Operation of the valve may be coordinated with operation of the pump of the exhaust system, such that when the pump supplies air to the chamber the valve is opened to permit gas to be exhausted from the chamber. Where a chamber of an assessment section comprises an outlet for exhausting gas from the chamber to the ambient environment, preferably, the assessment section further comprises at least one filter arranged between the outlet and the ambient environment. This may prevent or inhibit the apparatus from emitting output from smoking articles and aerosol-generating systems into the ambient environment. Advantageously, the may enable the apparatus to be used in an environment in which smoking is not permitted.

At least one filter may be arranged between the first outlet and the ambient environment. At least one filter may be arranged between the second outlet and the ambient environment. The filter may be any suitable type of filter. For example, the filter may be a carbon filter. The filter may comprise activated carbon.

In some embodiments, an outlet of a chamber may not be arranged to exhaust gas from the chamber to the ambient environment, but rather may be arranged to exhaust gas from the chamber to a filter and back into the chamber.

Each assessment section comprises a conduit having an inlet end and an outlet end.

The inlet end of each conduit is configured to receive the mouth end of a smoking article or the mouth end of an aerosol-generating system. Preferably, the inlet end of a conduit may comprise a seal for receiving a mouth end an aerosol-generating system or a mouth end of a smoking article and forming a seal with the smoking article or aerosol-generating system. Advantageously, providing a seal between the inlet end of the conduit and the smoking article or aerosol-generating system may ensure that air drawn through the conduit by the pump is primarily drawn through the aerosol-generating system or the smoking article at the inlet end, rather than around the outside of the aerosol-generating system or smoking article. In some preferred embodiments, the seal may comprise at least one annular labyrinth seal.

Each conduit may comprise one or more lengths of tubing. The tubing may be any suitable type of tubing. Typically the tubing is formed from a substantially transparent material, such that an observer may view the mainstream output from an aerosol-generating system or smoking article being drawn through the conduit.

Each conduit may comprise a display section. A display section may be a section of the conduit having a larger width or diameter than other sections of the conduit, which improves the visibility of the output of an aerosol-generating system or smoking article being drawn through the conduit.

In some particular embodiments, the display section comprises an inner tube extending upwards or vertically, away from the housing, and an outer tube arranged over the inner tube, the outer tube having a larger width or diameter than the inner tube. In this arrangement, the display section forms a column in which output from an aerosol-generating system or a smoking article is drawn up through the inner tube and down through the outer tube. Such a column may be visible from any side of the apparatus. Preferably, at least the outer tube is formed from a substantially transparent material, such that an observer may view the contents of the outer tube.

Some sections of the conduit may be arranged within the housing of the apparatus. However, preferably as much of the conduit as possible is formed from a substantially transparent material and arranged above the housing, so that a user can see the output of an aerosol-generating system or smoking article being drawn through the conduit.

Preferably, each assessment section comprises a holder for holding an aerosol-generating system or a smoking article. Preferably, one or more holders are spaced from the inlet end of a conduit for supporting an aerosol-generating system or a smoking article received in the inlet end of the conduit.

In some embodiments, the inlet end of the conduit of the assessment section may engage the mouth end of the aerosol-generating system or a smoking article with sufficient force to hold the aerosol-generating system or smoking article in the inlet end without the need for a separate holder. In these embodiments, the inlet end of the conduit of the assessment section may be the holder. For example, the inlet end of a conduit may engage the mouth end of a smoking article with an interference fit that provides sufficient friction against the smoking article to hold the smoking article in the inlet end of the conduit, in a horizontal orientation, against the force of gravity.

Each assessment section may further comprise a filter receptacle arranged between the inlet end of the conduit and the outlet end of the conduit. The filter receptacle may comprise an inlet in fluid communication with the inlet end of the conduit, an outlet in fluid communication with the outlet end of the conduit and a cavity for receiving a filter arranged between the inlet and outlet. When a filter is received in the filter receptacle, the filter is arranged in the airflow pathway. Air drawn along the airflow pathway by the pump is drawn through the conduit from the inlet end to the outlet end and through the filter receptacle, from the inlet to the outlet. When the mouth portion of an aerosol-generating device or a smoking article is received in the inlet end of the conduit, the output from the aerosol-generating device or smoking article is drawn along the airflow pathway and is drawn into contact with a filter received in the filter receptacle.

The filters received in the filter receptacles are of the type to trap particulate phase compounds from the output of a smoking article. Particulate phase compounds may also be referred to as nicotine-free, dry particulate matter. Typically, the output of conventional smoking articles comprises particulate phase compounds. In contrast, the output from an aerosol-generating system may comprise negligible amounts of particulate phase compounds. For example, water and glycerine may form around 90% of the mass of an aerosol generated by an aerosol-generating device.

Preferably, the filters received in the filter receptacles are glass fibre filter pads. Such filter pads are typically referred to as Cambridge filter pad. Cambridge filter pads are typically configured to trap particulate phase compounds from the output of smoking articles. Unused Cambridge filter pads are typically white in colour. Particulate phase compounds trapped by a white Cambridge filter pad are typically visible on the Cambridge filter pad as a yellow or brown colour. Accordingly, the presence of particulate phase compounds in the output of a smoking article or an aerosol-generating system may be visibly detectable by passing the output through a Cambridge filer pad.

The filters received in the filter receptacles may be any suitable type of filters for filtering or trapping particulate phase compounds from the output of a smoking article. Preferably, the filters comprise glass fibres. The filters may be Cambridge filter pads. Typically, a Cambridge filter pad comprises a disc of glass fibre, having a diameter of about 45 millimetres.

The filter receptacle may be any suitable receptacle for receiving a filter. The filter receptacle may be substantially impermeable to gases. Preferably, the filter receptacle is formed from a transparent material. Advantageously, forming the filter receptacle from a transparent material may enable an observer to inspect a filter received in the filter receptacle and observe a change in colour of the filter. The filter receptacle may be formed from any suitable material, such as a plastics material, resin or glass.

In particularly preferred embodiments, the filter receptacle is configured to draw output from a smoking article or an aerosol-generating system through an upper surface of a filter that is visible to a user. This ensures that the highest concentration of particulate matter trapped by the filter, which is on the leading face of the filter, is visible to an observer.

For example, the filter receptacle may comprise a funnel shaped base and a lid. The lid may be removably securable over the base to define a cavity for receiving a filter between the base and the lid. The interface between the base and the lid may be substantially impermeable to gas. An inlet may be provided centrally in the base. The inlet may extend into the chamber in a conical nozzle. The lid may be angled or shaped directly above the inlet, to direct gas entering the chamber through the inlet outwards, towards the periphery of the chamber. An outlet may be provided in the base, radially spaced or offset from the central inlet. An annular filter pad may be received within the chamber of the receptacle. The filter pad may be arranged in the chamber with the nozzle of the inlet extending through a central hole in the filter pad. The outer periphery of the filter pad may be trapped between the periphery of the base and the lid. The filter pad may divide the chamber into an upper chamber above the filter pad, between the filter pad and the lid, and a lower chamber below the filter pad, between the filter pad and the base.

Each assessment section comprises a pump. Preferably each assessment section comprises a separate pump. However, in some embodiments a single pump may be used to draw air through the airflow pathways of more than one of the assessment sections. For example, in embodiments comprising first and second assessment sections, a single pump may be arranged to draw air through the airflow pathways of both the first and second assessment sections.

The pump may be any suitable type of pump for simulating a puff of a user on an aerosol-generating system or a smoking article. The pump is configured to draw air through the airflow pathway of the assessment section. The pump may be configured to draw air through the airflow pathway of the assessment section with a particular puff profile.

Typically the pump is a piston pump. The piston pump may comprise a syringe having a piston forming an interference fit in an internal passage of the system.

The pump may be driven by any suitable means. For example, the pump may be driven by a linear actuator. The pump may be driven by an electric motor.

The apparatus may comprise one or more light sources. The one or more light sources may be arranged to illuminate one or more portions of the first and second assessment sections. The first assessment section may comprise one or more light sources for illuminating one or more of the components of the first assessment section. The second assessment section may comprise one or more light sources for illuminating one or more of the components of the second assessment section.

The one or more light sources may be arranged to illuminate any suitable component or portion of an assessment section. One or more light sources may be arranged to illuminate an aerosol-generating device or smoking article received in the inlet end of a conduit of an assessment section. One or more light sources may be arranged to illuminate a portion of the conduit of an assessment section. One or more light sources may be arranged to illuminate a display section of a conduit. Preferably, one or more light sources may be arranged to illuminate a filter receptacle of an assessment section. In particular, one or more light sources may be arranged to illuminate a filter received in the filter receptacle of an assessment section.

The one or more light sources may be configured to emit light with any suitable wavelength. Preferably, the one or more light sources are configured to emit light comprising wavelengths in the ultraviolet range. As used herein, references to wavelengths of light in the visible range refer to electromagnetic radiation with a wavelength from about 400 nanometres to about 700 nanometres. As used herein, references to wavelengths of light in the ultraviolet or UV range refer to electromagnetic radiation with a wavelength from about 10 nanometres to about 400 nanometres and references to wavelengths of light in the UV-A range refer to electromagnetic radiation with a wavelength from about 315 nanometres to about 400 nanometres. Advantageously, radiation with a shorter wavelength tends to reflection more than radiation with a longer wavelength. Accordingly, using light sources which emit visible light with a wavelength at the shorter end of the visible spectrum and certain wavelengths within the ultraviolet range, particularly the UV-A range, may illuminate deposits on filter in the filter receptacle more than wavelengths of light at the higher end of the visible spectrum, such as the red and infrared range.

The one or more light sources may be any suitable type of light source. Preferably, the one or more light sources comprise a light emitting diode. Preferably the one or more light sources comprise a light emitting diode which emits light with a wavelength within the ultraviolet range, which may be referred to as a UV LED.

At least one of the assessment sections may be configured to receive an aerosol-generating system.

In a particularly preferred embodiment, the first assessment section is configured to receive an aerosol-generating system. The aerosol-generating system may comprise an aerosol-generating article and an aerosol-generating device configured to receive the aerosol-generating article. In such embodiments, the first holder may be configured to hold the aerosol-generating device and the inlet of the first conduit may be configured to receive the mouth end of an aerosol-generating article.

In the particularly preferred embodiment, the aerosol-generating system comprises an aerosol-generating article. The aerosol-generating article may comprise a plurality of elements assembled within a wrapper in the form of a rod having a mouth end and a distal end upstream from the mouth end, the plurality of elements including the aerosol-forming substrate located at or towards the distal end of the rod. Preferably, the aerosol-forming substrate is a solid aerosol-forming substrate. In a particularly preferred embodiment, the aerosol-forming substrate comprises a gathered crimped sheet of homogenised tobacco material. In use, a user may draw on the mouth end of the article in order to inhale aerosol generated by the aerosol-generating article.

In the particularly preferred embodiments, the aerosol-generating system comprises an aerosol-generating device configured to receive an aerosol-generating article comprising an aerosol-forming substrate. Preferably, the device comprises a proximal end having a cavity for receiving an aerosol-forming substrate. The cavity may be adapted to receive the end of an aerosol-generating article comprising the aerosol-gorming substrate.

In preferred embodiments, the aerosol-generating device comprises a distal end, opposite the proximal end. In preferred embodiments, an electrical connector is arranged at the distal end of the aerosol-generating article.

Preferably, the aerosol-generating device comprises an atomiser arranged to atomise aerosol-forming substrate received by the device. In preferred embodiments, the atomiser is an electric heater arranged in the cavity for atomising aerosol-forming substrate received in the cavity.

The aerosol-generating device may comprises a power supply, such as one or more batteries and capacitors. The aerosol-generating device may further comprise a controller, for controlling the supply of power from the power supply to the atomiser.

The aerosol-generating device may be portable. The aerosol-generating device may be a handheld device. In other words, the aerosol-generating device may have any size and shape suitable to be held in the hand of a user. The aerosol-generating device may be substantially circularly cylindrical. The aerosol-generating device may have a size and shape similar to a conventional cigarette or cigar. The aerosol-generating device may have a length between about 30 mm and about 150 mm. The aerosol-generating device may have an external diameter between about 5 mm and about 30 mm.

The first holder of the present invention may further comprise an interface for coupling to an aerosol-generating device. The interface may comprise an electrical connector. Where the aerosol-generating device comprises an electrical connector, the interface of the first holder may be configured to electrically connect to the electrical connector of the aerosol-generating device when the aerosol-generating device is received in the first holder. The electrical connector may be configured to transfer one or more of power and data to an aerosol-generating device held in the first holder.

At least one of the assessment sections may be configured to receive a smoking article.

In a particularly preferred embodiment, the second assessment section is configured to receive a smoking article. In this embodiment, the inlet end of the second conduit is configured to receive a mouth end of a smoking article. In these particularly preferred embodiments, the inlet end of the second conduit may be the second holder.

In these embodiments, the inlet end of the second assessment section comprises an annular seal having an inner diameter of between about 5 millimetres and about 12 millimetres, such that the mouth end of a smoking article may be received in the annular seal with an interference fit.

In these embodiments, the second assessment section may further comprise a lighter. The lighter is configured to ignite the distal end of a smoking article. The lighter may be any suitable type of lighter. Preferably, the lighter is an electrically heated lighter. An electrically heated lighter may comprise an exposed electrically resistive wire.

In these embodiments, the second assessment section may further comprise an ashtray. The ashtray may be arranged in the second chamber, below a smoking article received in the inlet end of the second conduit. The ashtray may be arranged to catching ash from the lit smoking article. The ashtray may be sized to receive a used smoking article, after a smoking article has been used by the second assessment section. The ashtray may comprise a compartment configured to receive a plurality of used smoking articles. Preferably, the ashtray comprises a lid for covering the compartment to prevent or inhibit gases from the used smoking articles escaping from the compartment.

In some embodiments, the apparatus may comprise one or more user interfaces. In particular, a user interfaces may comprise a display. In some embodiments, each assessment section may comprise a user interface. The first assessment section may comprise a first user interface. The second assessment section may comprise a second user interface.

In some embodiments, the user interface may be configured to display aspects of the operation of the assessment sections during operation of the apparatus. In embodiments where each assessment section comprises a user interface, each user interface may be configured to display aspects of operation of its assessment section.

The one or more user interfaces may be configured to display at least one of: the total number of puffs taken by the assessment section on a smoking article or an aerosol-generating system; the number of puffs remaining; the time remaining; the temperature of the smoking article or the aerosol-generating system. Where the apparatus comprises one or more air quality sensors, the one or more user interfaces may be configured to display one or more air quality readings.

The one or more user interfaces may be configured to enable a user to control operation of the apparatus. For example, a user interface may be configured to enable a user to control operation of a lighter or an interface of an assessment section. A user interface may be configured to control operation of the pumps. A user interface may be configured to enable a user to control the puffing regime applied to an aerosol-generating system or a smoking article. In particular, a user interface may be configured to start a puffing regime applied to an aerosol-generating system or a smoking article. A user interface may also be configured to stop a puffing regime applied to an aerosol-generating system or a smoking article before the end of the puffing regime.

Several components of the apparatus, such as pumps, controllers, interfaces, lighters, user interfaces and light sources typically require a supply of electrical power. Preferably, each of these components is connected or connectable to a power supply. In some embodiments, the apparatus comprises a connector for connecting the apparatus to an external power supply, such as a mains power supply. In some embodiments, the apparatus comprises a power supply housed in the housing. Providing a power supply in the housing of the apparatus may enable the apparatus to be portable. Preferably, the power supply is a battery, such as a lithium iron phosphate battery. In some embodiments, the power supply may comprise another charge storage device, such as a capacitor. In some embodiments, the apparatus comprises a rechargeable power supply. The rechargeable power supply may have a capacity that allows for the storage of enough energy for the completion of one or more puffing regimes of a smoking article or an aerosol-generating system in each of the first and second assessment sections. The power supply may have sufficient capacity to allow for a predetermined number of discrete puffing regime completions of the first and second assessment sections. Where the apparatus comprises a rechargeable power supply, the apparatus may further comprise a connector for connecting the apparatus to an external power supply for recharging the rechargeable power supply.

Preferably, the apparatus comprises circuitry for controlling and connecting different components of the apparatus. Particularly preferably, the circuitry is configured to operate or drive each assessment section substantially simultaneously, such that an observer may directly compare the operating of the aerosol-generating systems and smoking articles being tested in the assessment sections.

In some preferred embodiments comprising one or more air quality sensors, the apparatus comprises air quality monitoring circuitry connected to the one or more air quality sensors. The air quality monitoring circuitry may also be connected to one or more user interfaces of the apparatus. The air quality monitoring circuitry may be configured to receive data from the first and second air quality sensors, process the data and a send the processed data to the user interface for display to an observer.

In some preferred embodiments, the apparatus comprises heater control circuitry. The heater control circuitry may be configured to control the heating of an aerosol-generating system or the ignition of a smoking article received in an assessment section.

The heater control circuitry may be configured to supply a signal to an aerosol-generating device coupled to an interface of an assessment section to activate the aerosol-generating device to heat an aerosol-generating article received in the device.

The heater control circuitry may be configured to supply power to a lighter of an assessment section for heating an end of a smoking article held in the inlet end of the conduit.

In some embodiments, lighters and interfaces of assessment sections may be movable between a disengaged position and an engaged position. In the disengaged position, a lighter is spaced from a smoking article, such that the lighter is not in a position to ignite a smoking article. In the disengaged position, an interface is spaced from an aerosol-generating system, such that the interface is not in a position to operate the aerosol-generating system. In the engaged position, a lighter is arranged in a position relative to a smoking article in which the lighter may ignite the smoking article. In the engaged position, an interface is electrically connected to an aerosol-generating system, such that the interface may control operation of the aerosol-generating system. In these embodiments, the lighters and interfaces may be movable by an actuator, such as an electric motor. The actuator may be controlled by the heater control circuitry.

In some preferred embodiments, the apparatus comprises pump control circuitry. The pump control circuitry may be configured to supply power to the first pump and supply power to the second pump. In particular, the pump control circuitry may be configured to control the supply power to the first and second pumps such that the first and second pumps operate substantially simultaneously to draw air through the first and second airflow pathways in a plurality of substantially simultaneous puffs.

Several components of the apparatus, such as the pumps, interfaces, lighters, and light sources may be controller by a controller. In particular, the controller may comprise one or more of the control circuits. The controller may comprise a microprocessor, which may be a programmable microprocessor, a microcontroller, or an application specific integrated chip (ASIC) or other electronic circuitry capable of providing control.

The controller may be connected to the pumps of the assessment sections. The controller may be configured to control the operation of the pumps of the assessment sections. Preferably, the controller is configured to operate the pumps of the assessment sections substantially simultaneously. The controller may be configured to operate the pumps of the assessment sections to deliver a predetermined puffing regime to a smoking article or an aerosol-generating system held in the assessment sections. The controller may be configured to operate the pumps of the assessment sections to deliver the same predetermined puffing regime to all of the assessment sections.

Where the assessment sections comprise one or more air quality sensors, the controller may be connected to the one or more air quality sensors. The controller may be configured to send signals to the air quality sensors. The controller may be configured to receive signals from the air quality sensors. The controller may be configured to receive air quality readings from each air quality sensor. The controller may comprise a processor configured to process the readings from each air quality sensor.

Where one or more of the assessment sections comprise a user interface, the controller may be connected to the user interfaces. The controller may be configured to receive signals from the user interfaces. The controller may be configured to send signals to the user interfaces.

Where one or more of the assessment sections comprises a lighter for lighting an aerosol-generating article, the controller may be connected to the one or more lighters. The controller may be configured to control a supply of power to the lighter.

Where one or more of the assessment sections comprises an interface for electrically connecting the apparatus to an aerosol-generating device received in the holder, the controller may be connected to the interface. The controller may be configured to receive signals from the interface and an aerosol-generating device engaged with the interface. The controller may be configured to send signals to the interface and an aerosol-generating device engaged with the interface.

Where the apparatus comprises one or more light sources, the controller may be connected to the one or more light sources. The controller may be configured to control the illumination of the one or more light sources.

In some embodiments, the controller may be configured to communicate wirelessly with a user interface. For example, the controller may be configured to communicate wirelessly with an application on an operator's mobile phone. The controller may be configured to communicate wirelessly with a remote user interface using any suitable wireless protocol. This may enable an operator to control the device remotely, from a device wirelessly connected to the controller of the apparatus.

Some components of the assessment sections may be arranged or housed within the housing. Some components of the assessment sections may be arranged on or supported by the housing. The housing of the present invention may provide a base to support one or more of the components of each assessment section. Preferably, the pump of each assessment section may be housed in the housing. Preferably, the circuitry and controller of the apparatus may be housed in the housing. Preferably, the holder of each assessment section is supported on the housing, in the chamber formed between the cover and the housing. Preferably, the inlet end of the conduit of each assessment section is supported on the housing. Preferably, the filter receptacle of each assessment section is supported on the housing.

The housing may have any suitable shape and size. Preferably, the housing comprises a substantially rectangular cuboid.

The housing may be formed from any suitable material. Examples of suitable materials include metals, alloys, plastics or composite materials containing one or more of those materials, or glass or thermoplastics, for example polypropylene, polyetheretherketone (PEEK) and polyethylene. In some particular embodiments, one or more sides of the housing is formed from a substantially transparent material. Preferably, an upper side or surface of the housing may be formed a transparent material.

The apparatus of the present invention may have any suitable form and size. Preferably, the apparatus of the present invention is a table top device. In other words, the apparatus of the present invention may have a suitable size and shape to be supported on a table or a work surface.

Preferably, each assessment section of the apparatus is substantially aligned on the apparatus. In some preferred embodiments, the apparatus comprises a length and each assessment section is arranged substantially along the length of the apparatus, with corresponding components of the assessment section arranged at substantially the same position along the length of the apparatus. This may enable an observer to directly compare the output of an aerosol-generating system or a smoking article received in each assessment section.

The assessment sections of the apparatus may have some features that are similar to a conventional smoking machine. Conventional smoking machines are devices which simulate a person smoking a conventional smoking article or using an aerosol-generating article under controlled conditions, typically to determine the amount of nicotine, condensate and carbon monoxide in the smoke of cigarettes and cigars.

The controller may be configured to drive the pump for each assessment section according to a predetermined puffing regime. Preferably, each assessment section is operated following the same predetermined puffing regime. Each assessment section may be operated using a standard puffing regime, such as a standard smoking regime for a smoking machine. An exemplary known standard smoking regime is the Health Canada Intense Smoking Regime (HCI), which uses a puff volume of 55 cubic centimetres, a puff duration of 2 seconds, a puff interval of 30 seconds, and 100% blocking of the filter ventilation. Another known standard smoking regime is the ISO smoking regime, which uses puffing conditions of a 3 cubic centimetre puff volume, a 2 second puff duration; and a puff frequency of once per minute. Another known standard smoking regime is the Massachusetts intense smoking regime, which uses 45 cubic centimetre puff volume, 2 second puff duration, 30 second puff interval and with 50% blocking of the filter ventilation.

As used herein, puff duration refers to the time during which reduced pressure is applied to the mouth end of a smoking article or an aerosol-generating system. For example, a regime may have a puff duration of about 1 second, about 1.5 seconds, about 2 seconds, about 2.5 seconds, about 3 seconds or about 3.5 seconds.

As used herein, puff frequency refers to the number of puffs taken in a specific period of time.

As used herein, puff interval refers to the period of time between successive puffs. For example, a regime may have a puff interval of about 10 seconds, about 20 seconds, 30 seconds, about 40 seconds, about 50 seconds or 60 seconds. For example, a regime may have a puff interval of at least 10 seconds, at least 30 seconds, at least 60 seconds or at least 90 seconds.

As used herein, puff number refers to the number of puffs taken in one complete regime. For example, the puff number may be 1, 2, 3, 4, 5, 6, 7, 8, 9 or 10.

As used herein, puff profile refers to the temporal application of pressure through a puff.

As used herein, puff volume refers to the volume of gas drawn from the mouth end of a smoking article or an aerosol-generating device during a puff. For example, a regime may have a puff volume of about 20 millilitres, about 30 millilitres, about 35 millilitres, about 40 millilitres, about 50 millilitres, about 55 millilitres, about 60 millilitres or about 70 millilitres.

It will be appreciated that features described in relation to one aspect of the present invention may also be applied equally to the other aspects of the present invention. Features described in relation to the first aspect of the present invention may be applied equally to the second and third aspects of the present invention and vice versa. Features described in relation to the second aspect of the present invention may be applied equally to the third aspect of the present invention and vice versa.

The invention will be further described, by way of example only, with reference to the accompanying drawings, in which.

Figure 1:
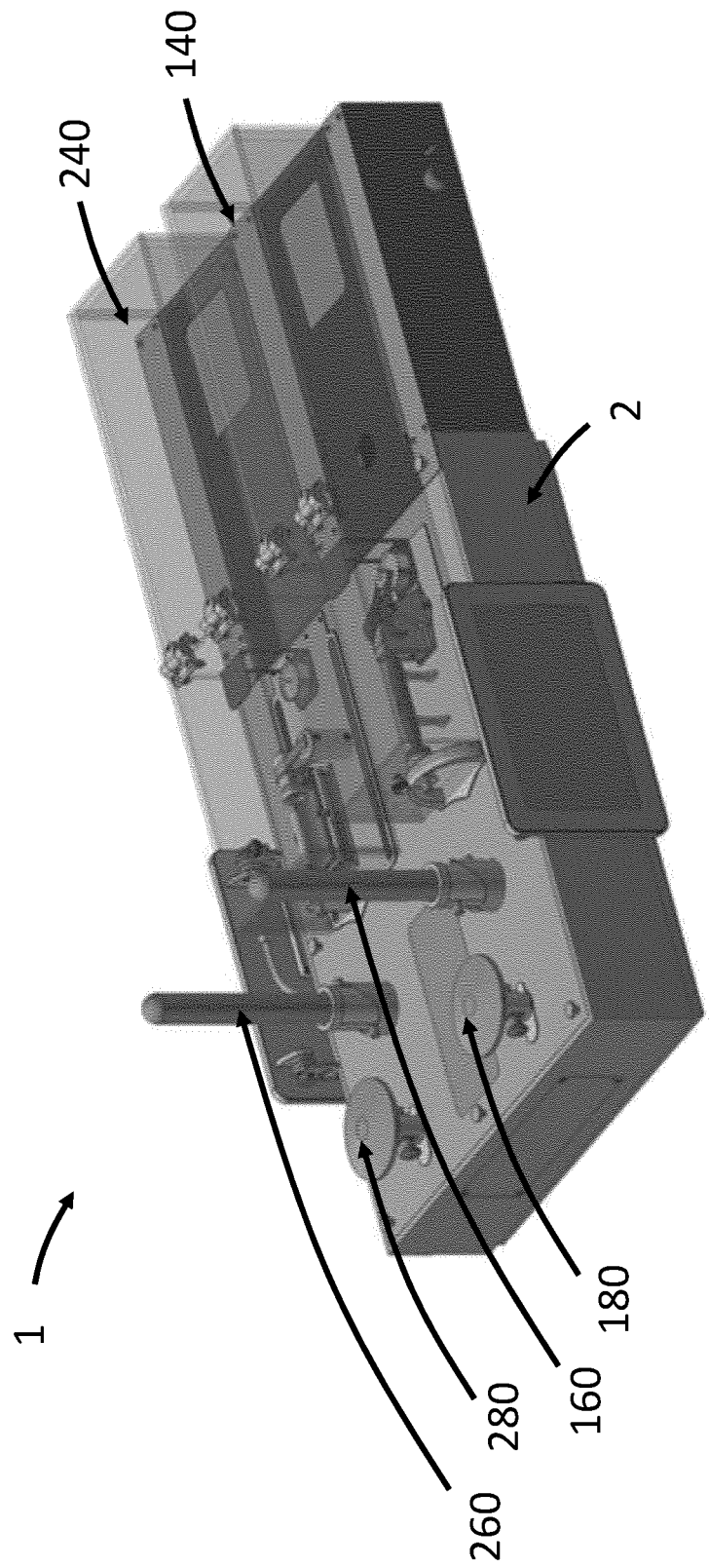
FIG. 1 shows a perspective view of an apparatus according to an aspect of the present invention.
Figure 2:
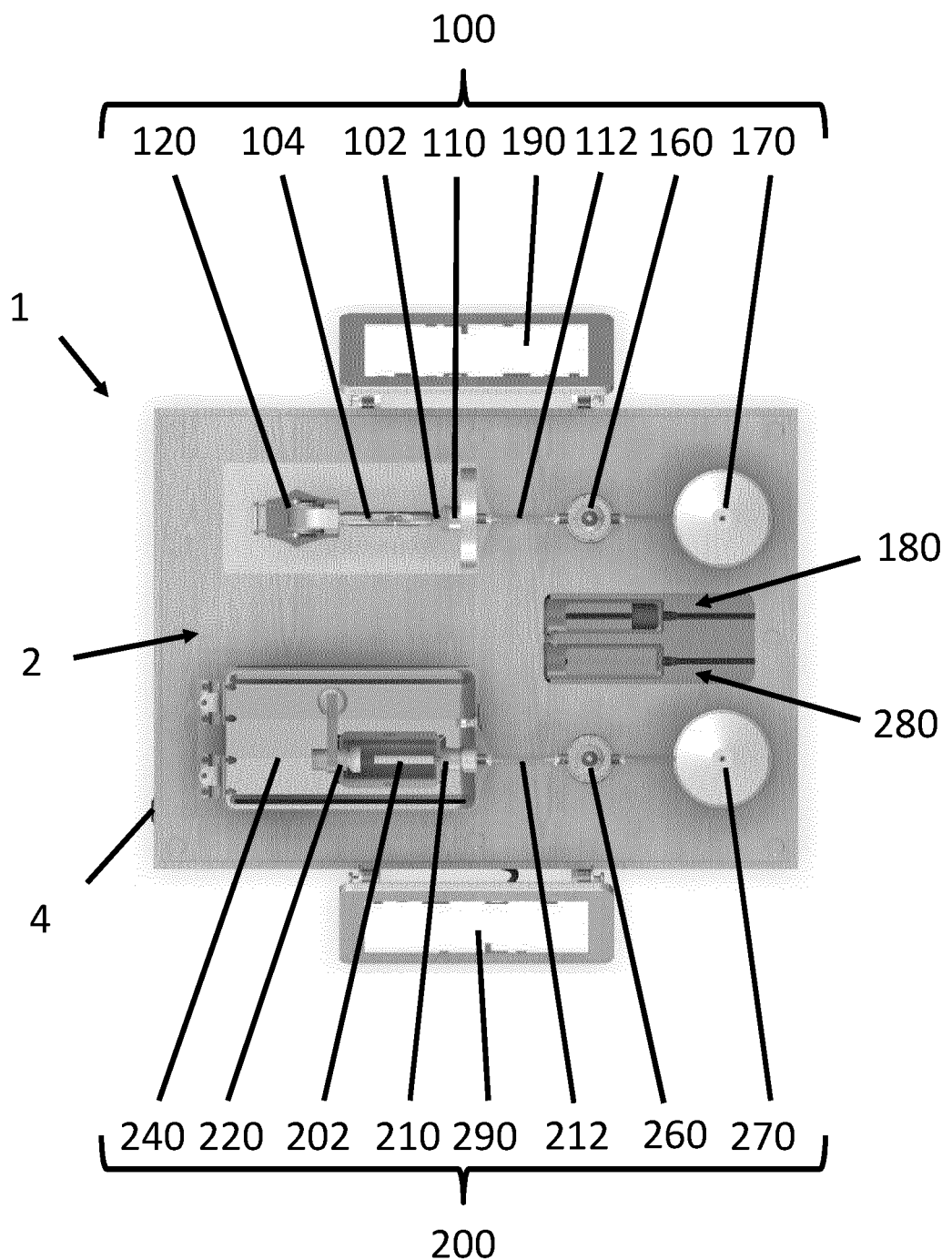
FIG. 2 shows a plan view of the apparatus of FIG. 1.

FIGS. 1 and 2 show schematic illustrations of an apparatus 1 according to an embodiment of the present invention. The apparatus 1 is configured to capture, display and compare the output from a conventional smoking article and the output from an aerosol-generating system.

The apparatus 1 is intended to be supported on a table or a work surface, and comprises a housing 2 in the form of a substantially rectangular box having a length of about 640 mm, a width of about 460 mm and a height of about 150 mm.

The apparatus 1 also comprises a first assessment section 100 and a second assessment section 200 supported by the housing 2. Each assessment section 100, 200 defines an airflow pathway, and comprises: a holder section configured to hold a smoking article or an aerosol-generating device and collecting the output from the smoking article or aerosol-generating device; a substantially transparent conduit; a capture section for capturing and displaying output products of conventional smoking articles and aerosol-generating devices; and a pump for drawing the output from a smoking article or an aerosol-generating device along the conduit and through the capture section.

Each assessment section 100, 200 occupies one side of the housing 2, and each assessment section 100, 200 extends substantially the length of the housing 2, from one end of the housing to the other. The holder section, conduit, capture section and pump of each assessment section 100, 200 are substantially aligned, with the corresponding parts of the other assessment section along the length of the housing 2 such that each stage of the assessment sections 100, 200 may be compared side by side.

In this embodiment, the first assessment section 100 is configured to receive an aerosol-generating system and the second assessment section is configured to receive a conventional smoking article, such as a cigarette. The holder sections of the first and second assessment sections 100, 200 have substantial differences, and so will be discussed separately.

Figure 3:
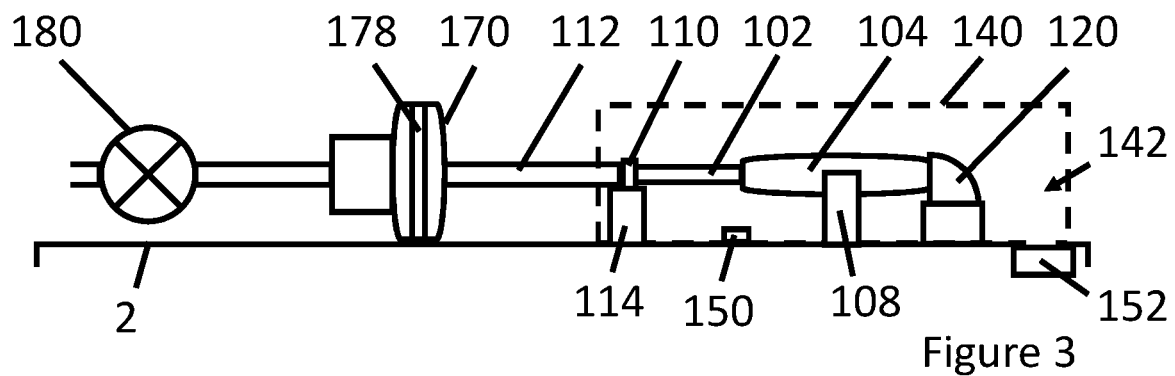
FIG. 3 shows a schematic illustration of the first assessment section of the apparatus of FIG. 1.
Figure 4:
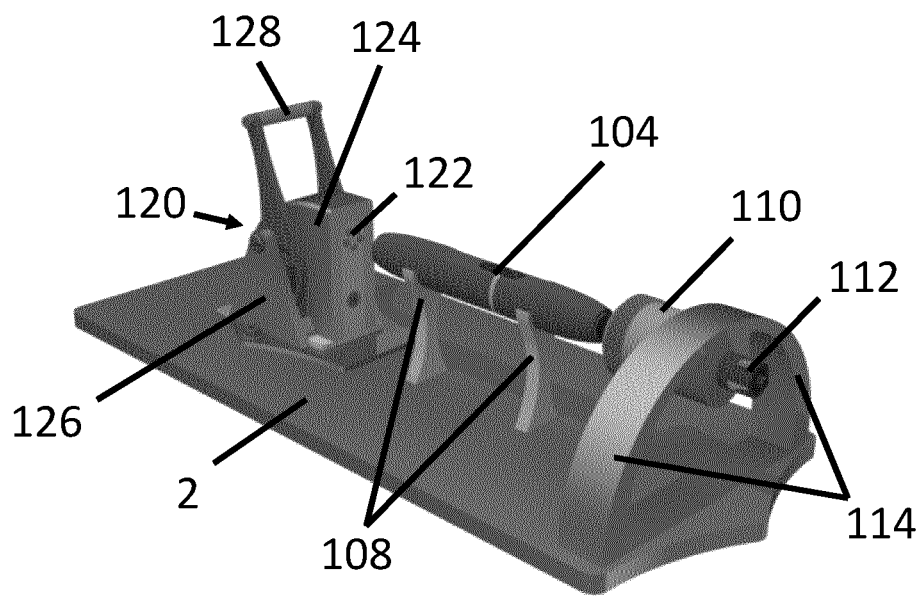
FIG. 4 shows a perspective view of a holder section of the first assessment section of the apparatus of FIG. 1, with the interface in the disengaged position.
Figure 5:
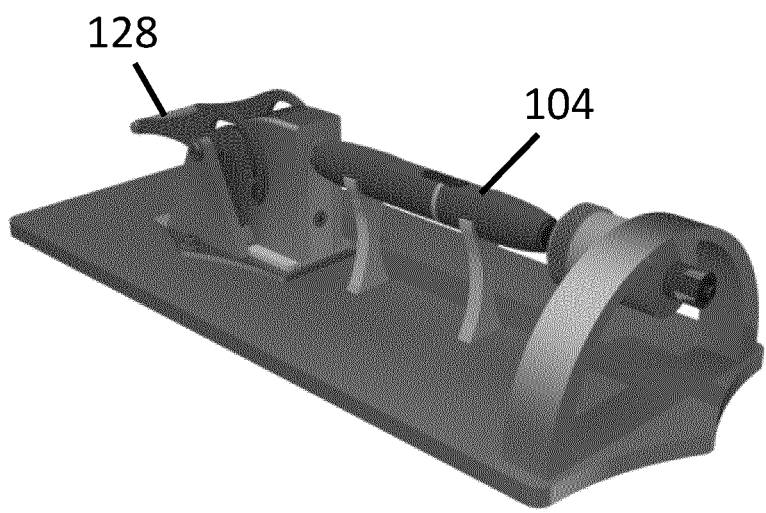
FIG. 5 shows a perspective view of a holder section of the first assessment section of the apparatus of FIG. 1, with the interface in the engaged position.

The first assessment section 100 is shown in more detail in FIGS. 3 to 5. The first assessment section 100 is configured to receive an aerosol-generating system. In this embodiment, the first assessment section 100 is configured to receive an aerosol-generating system comprising an aerosol-generating article 102 and an aerosol-generating device 104 configured to receive the aerosol-generating article 102. The aerosol-generating article 102 generally comprises a plurality of elements assembled within a wrapper in the form of a rod having a mouth end and a distal end upstream from the mouth end. The plurality of elements of the article 102 include an aerosol-forming substrate located at or towards the distal end of the rod. Preferably, the aerosol-forming substrate is a solid aerosol-forming substrate, such as a gathered crimped sheet of homogenised tobacco material. The aerosol-generating device 104 generally comprises a proximal end having an open cavity for receiving the distal end of the aerosol-generating article, a heating arrangement for heating the portion of the aerosol-generating article 102 received in the cavity and a distal end, opposite the proximal end, having an interface configured to connect to a complimentary interface and enable the transfer of power and data between the interfaces.

The first assessment section 100 defines a first airflow pathway that extends substantially the length of the housing 2, generally along a longitudinal axis.

Figure 6:
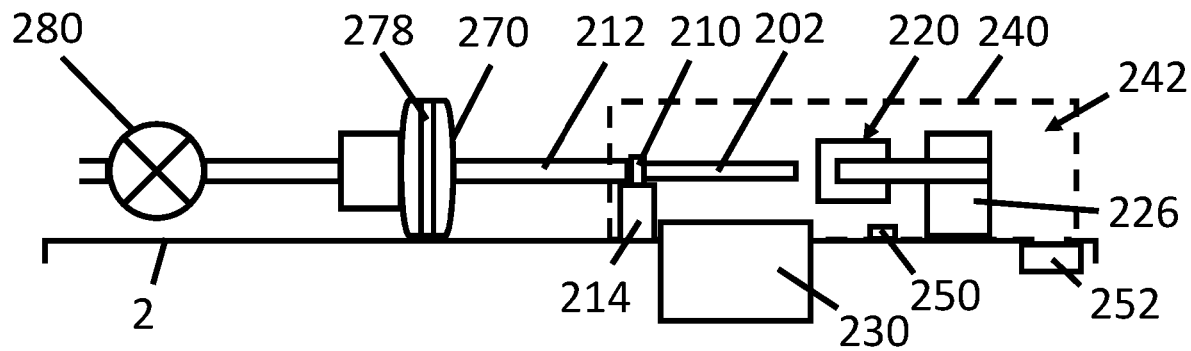
FIG. 6 shows a schematic illustration of the second assessment section of the apparatus of FIG. 1.
Figure 7:
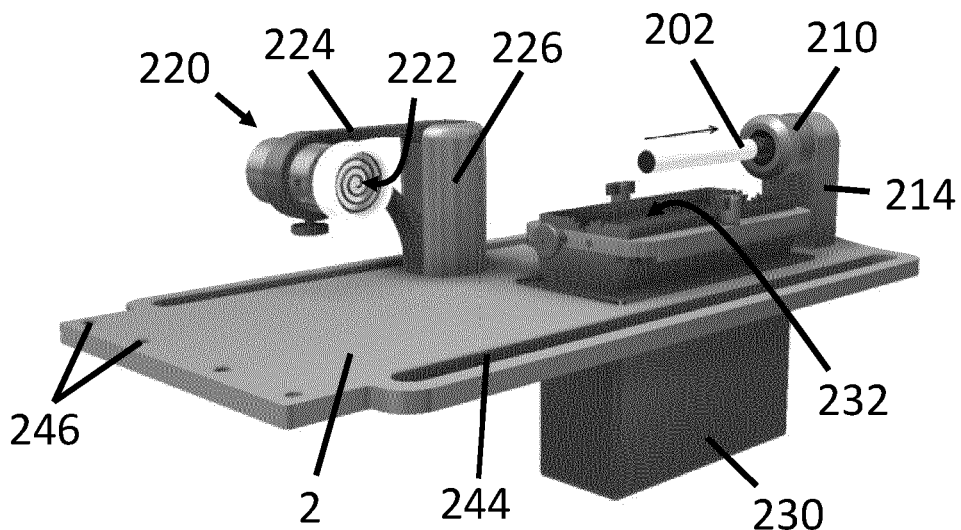
FIG. 7 shows a perspective view of a holder section of the second assessment section of the apparatus of FIG. 1.
Figure 8:
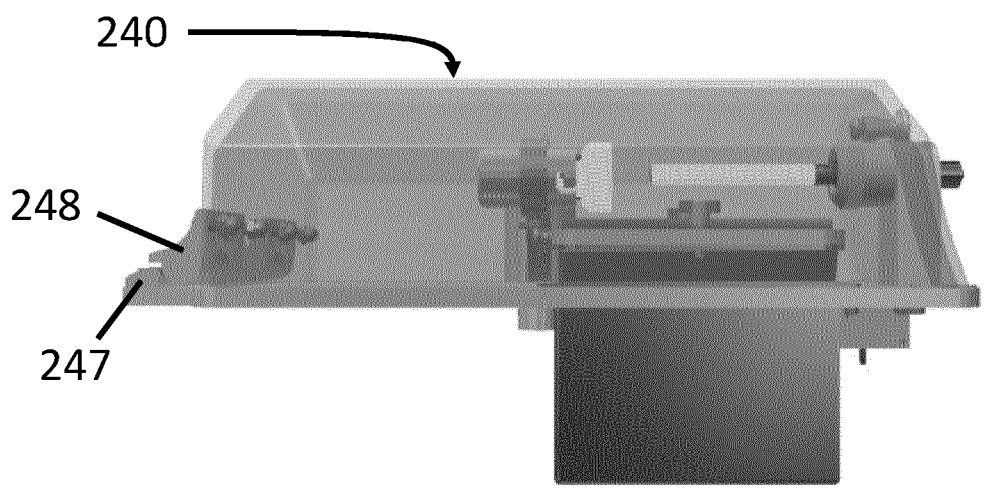
FIG. 8 shows a side view of a holder section of the second assessment section of the apparatus of FIG. 1, with the cover in position forming a gas tight chamber with the housing.

The second assessment section 200 is shown in more detail in FIGS. 6 to 8. The second assessment section 200 is configured to receive a conventional cigarette 202.

The second assessment section 200 defines a second airflow pathway that extends substantially the length of the housing 2, generally along a longitudinal axis substantially parallel to the longitudinal axis of the first assessment section 100.

The first assessment section 100 comprises a holder section at one end of the housing 2. The holder section generally comprises: a pair of holders 108, an inlet end 110 of a conduit 112, an interface 120, and a cover 140.

The pair of holders 108 comprise a pair of columns spaced apart along the longitudinal axis of the first airflow pathway for supporting the aerosol-generating device 104 above the housing 2 at its proximal and distal ends.

The inlet end 110 of the conduit 112 is adapted to receive the mouth end of an aerosol-generating article 102, when the aerosol-generating article 102 is received in an aerosol-generating device 104 supported on the holders 108. The inlet end 110 of the conduit 112 is an annular a labyrinth seal that is substantially impermeable to the components of cigarette smoke, having dimensions appropriate to hold an aerosol-generating article. The inlet end 110 of the conduit 112 is supported above the housing 2 on columns 114, which extends upwards from the housing 212 by the same amount as the holders 108.

The interface 120 is adapted to electrically connect the apparatus 1 to an aerosol-generating device 104 supported on the holders 108. The interface 120 comprises an electrical connector 122 configured to electrically connect to a corresponding electrical connector at the distal end of an aerosol-generating device 104. The electrical connector 122 is supported above the housing 2 by a carriage 124, which extends upwards from the housing 2 by the same amount as the holders 108. The carriage 124 is slidably mounted to the housing 2 on a frame 126, which is spaced from the holders 108 on the longitudinal axis of the first assessment section, on the opposite side of the holders 108 to the inlet end 110 of the conduit 112. The carriage 124 is slidable along the longitudinal axis of the first assessment section 100 between a disengaged position and an engaged position. In the disengaged position, the electrical connector 122 is spaced from the distal end of an aerosol-generating device 104 supported on the holders 108 and electrically isolated from the device 104. In the engaged position, the electrical connector 122 is in contact with the distal end of an aerosol-generating device 104 supported on the holders 108 such that the electrical connector 122 may make an electrical connection with a corresponding electrical connector at the distal end of the aerosol-generating device 104. The carriage 124 is slidable between the disengaged and engaged positions by rotating a handle 128, which is rotatably coupled to the carriage 124 and the frame 126. FIG. 4 shows the interface 120 in the disengaged position, electrically isolated from an aerosol-generating device 104 and FIG. 5 shows the interface 120 in the engaged position, in electrical connection with an aerosol-generating device 104.

The second assessment section 200 comprises a holder section at one end of the housing 2, adjacent the holder section of the first assessment section 100.

The second assessment section 200 is configured to receive the mouth end of a cigarette 202 at an inlet end 210 of a conduit 212. The inlet end 210 of the conduit 212 is arranged in the holder section of the second assessment section 200. The inlet end 210 of the conduit 212 is an annular a labyrinth seal that is substantially impermeable to the components of cigarette smoke, having dimensions appropriate to hold a standard cigarette. The cigarette 202 is held in the inlet end 210 of the conduit 212 by friction. Since friction is sufficient to hold a cigarette 202 in the inlet end 210 of the conduit 212, the inlet end 210 of the conduit 212 forms the holder for the cigarette 202. It will be appreciated that in some embodiments a separate holder may be provided in the holder section to support the distal end of a smoking article received in the inlet end of the conduit, particularly in embodiments configured for receiving larger smoking articles, such as cigars. The inlet end 210 of the conduit 212 is supported above the housing 2 on a column 214, which extends upwards from the housing 2 by the same amount as the holders 108 and columns 114 of the first assessment section 100.

The holder section of the second assessment section 200 further comprises a lighter assembly 220 for lighting a cigarette held in the inlet end 210 of the conduit 212. The lighter assembly 220 comprises an electrically heated cigarette lighter 222 comprising an exposed electrically resistive wire. The electrically heated cigarette lighter 222 is arranged at one end of an arm 224, and the opposite end of the arm 224 is supported by a post 226. The post 226 supports the arm 224 and the lighter 222 above the housing 2 at the same height from the housing 2 as the column 214. The post 226 is rotatably mounted to the housing 2, and offset from the longitudinal axis of the second assessment section 200 such that rotation of the post 226 brings the exposed electrically resistive heating wire of the lighter 222 into alignment with the longitudinal axis of the second assessment section 200, sufficiently close to the distal end of a cigarette 202 held in the inlet end 210 of the conduit 212 to light the cigarette 202. The post 226 is rotatable between a disengaged position and an engaged position. In the disengaged position, the exposed electrically resistive wire of the electric lighter 220 is not aligned with the longitudinal axis of the second assessment section 200. In the engaged position, the exposed electrically resistive wire of the electric lighter 220 is aligned with the longitudinal axis of the second assessment section 200 and held in close proximity to the distal end of a cigarette 202 held in the inlet end 210 of the conduit 212. FIG. 7 shows the lighter 222 in the disengaged position. FIG. 8 shows the lighter 222 in the engaged position.

The holder section of the second assessment section 200 further comprises an ashtray 230 arranged substantially below the location of a cigarette 202 held in the inlet end 210 of the conduit 212. The ashtray 230 comprises a compartment 232 having a volume that is large enough to hold at least 10 cigarettes. The compartment 232 is open at an upper end to enable a cigarette held in the inlet end 210 of the conduit 212 to be deposited into the ashtray 230. The ashtray 230 further comprises a closure that is moveable over the open upper end of the compartment 232 to substantially prevent gases from used cigarettes in the compartment 232 from being released from the compartment 232.

The holder sections of the first and second assessment sections both further comprise a cover arranged over the housing. The holder section of the first assessment section 100 comprises a cover 140 arranged over the housing 2. The cover 140 and the housing 2 form a chamber 142 enclosing the inlet end 110 of the conduit 112, the columns 114, and the holders 108 and interface 120. The holder section of the second assessment section 200 further comprises a cover 240 arranged over the housing 2. The cover 240 and the housing 2 form a chamber 242 enclosing the inlet end 210 of the conduit 212, the column 214, the lighter 220 and the ashtray 230.

The covers 140, 240 of the first and second assessment sections 100, 200 are substantially identical and are removably mounted on the housing 2 in a substantially identical manner, which will be described with reference to the second assessment section 200 and FIGS. 7 and 8 only.

The cover 240 comprises flanges (not shown) at both sides that fit into slots 244 formed in the housing 2. The housing 2 also comprises mounting points 246 at the opposite end of the holder section to the inlet end 210 of the conduit 212. Hooks 247 are provided on the housing 2 at the mounting points 246, and corresponding latches 248 are provided on the cover 240, such that when the cover 240 is mounted on the housing 2 the latches 248 engage with the hooks 247 to secure the cover 240 to the housing 2. The cover 240 may be removably mounted to the housing 2 by inserting the flanges into the slots 244 and engaging the latches 248 with the corresponding hooks 247 on the housing 2. The interface between the cover 240 and the housing 2 may be substantially impermeable to gas, such that gas is substantially prevented or inhibited from flowing between the chamber 242 and the ambient environment. The latches 248 are flexible, such that the latches 248 may be urged out of the hooks 247 by a user to remove the cover 240 from the housing 2.

The holder sections of the first and second assessment sections 100, 200 both further comprise an air quality sensor in the chamber formed between the cover and the housing. The first assessment section 100 comprises a first air quality sensor 150 in the chamber 142. The second assessment section 200 comprises a first air quality sensor 250 in the chamber 142.

The first and second air quality sensors 150, 250 are substantially identical. In this embodiment, the first and second air quality sensors 150, 250 are metal oxide semiconductor gas sensors configured to sense carbon monoxide and carbon dioxide.

The holder sections of the first and second assessment sections 100, 200 both further comprise a filter leading to an exhaust. The filter is configured to remove a significant proportion of the components of the output of the aerosol-generating system and the smoking article from the air passing through the filter. This enables the apparatus 1 to exhaust gas from the chambers to the ambient environment in locations where it is prohibited to smoke or use aerosol-generating systems. The first assessment section 100 comprises a first filter 152 mounted at a vent in the housing 2 of the chamber 142 and fluidly connecting the vent to an exhaust in the housing 2. The second assessment section 200 comprises a second filter 252 mounted at a vent in the housing 2 of the chamber 242 and fluidly connecting the vent to an exhaust in the housing 2. It will be appreciated that in some embodiments the first and second assessment sections may share one or more of the filters and exhausts.

In this embodiment, each assessment section 100, 200 comprises an active venting system (not shown). As such, each chamber comprises an inlet in fluid communication with the pump of the assessment section. A system (not shown) is arranged between the pump and the inlet of the chamber and the pump and valve system are configured to supply air to the chamber after operation of the assessment section to draw air through the conduit and an aerosol-generating device or smoking article received in the holder section. This pushes gases within the chamber out of the chamber, through the filter, and to the ambient environment. The active venting system ensures that when an operator opens a chamber of the apparatus, the gas within the chamber does not comprise a significant volume of side-stream output from the aerosol-generating system or the smoking article in the chamber.

The conduits, capture sections and pumps of both the first and second assessment sections are substantially identical, and substantially aligned along the length of the housing 2, and so will be discussed together.

Each assessment section 100, 200 comprises a conduit extending from the inlet end to an outlet end. In this embodiment, each conduit comprises a display section arranged between the inlet end and the outlet end of the conduit. In each assessment section 100, 200, the conduit comprises the display section, a first length of clear plastic tubing extending from the labyrinth seal at the inlet end of the conduit to an inlet of the display section, and a second length of clear plastic tubing extending from an outlet of the display section to the outlet end of the conduit. The display section and the lengths of clear plastic tubing enable an observer to see the output from the aerosol-generating system and the smoking article as it is drawn along the conduit.

Figure 9:
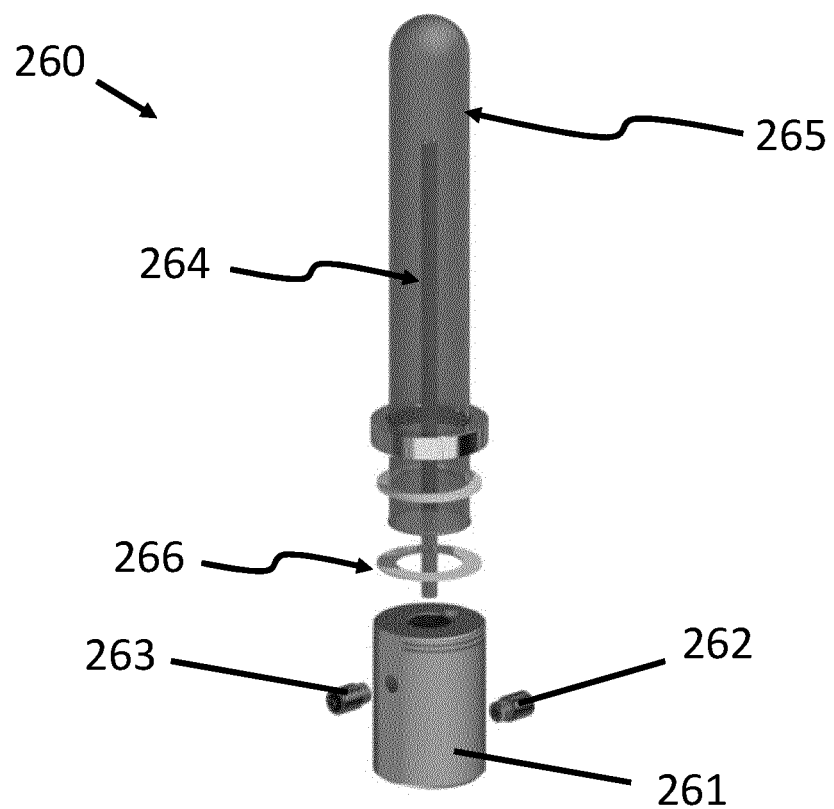
FIG. 9 shows an exploded view of a glass display vessel of the apparatus of FIG. 1.

The display section 160 of the first assessment section 100 is identical to the display section 160 of the second assessment section 200, and so only the display section 260 of the second assessment section 200 is described here, and shown in FIG. 9.

The display section 260 of the second assessment section 200 comprises an annular base 261 secured on the housing 2. The annular base 261 comprises a cylindrical inner chamber that is closed at a lower end and open at a top end. The annular base 261 comprises an inlet 262 and an outlet 263 extending through opposite sides of the annular base 261 into the internal chamber of the base 261. An inner tube 264 extends upwards from the inlet 262 in the inner chamber of the base 261 to an upper end. The inner tube has a similar internal diameter to the plastic tubing of the conduit 212 and is formed from a rigid and substantially transparent plastics material. An outer tube 265 is arranged over the inner tube 264, and comprises a substantially transparent glass tube having an open end attached to the base 261 and a closed end arranged above the upper end of the inner tube 264, spaced from the upper end of the inner tube 264. The outer tube 264 has an inner diameter that is greater than the outer diameter of the inner tube 264, and secured to the base 261 is a substantially gas impermeable seal arrangement 266. As such, the display section 260 forms a substantially annular chamber between the outer tube 265 and inner tube 266, that has an inlet at the upper end of the inner tube 264 and an outlet at the outlet 263 in the base.

As the output from the cigarette 202 is drawn along the conduit 212, from the inlet end 210 to the outlet end, the output is drawn into the display section 260 of the conduit 212 through the inlet 262. The output is drawn up the inner tube 264 and out of the upper end into the annular chamber between the outer tube 265 and the inner tube 264. The output is drawn down the annular chamber and out of the display section 260 through the outlet 263 in the base 261.

Figure 10:
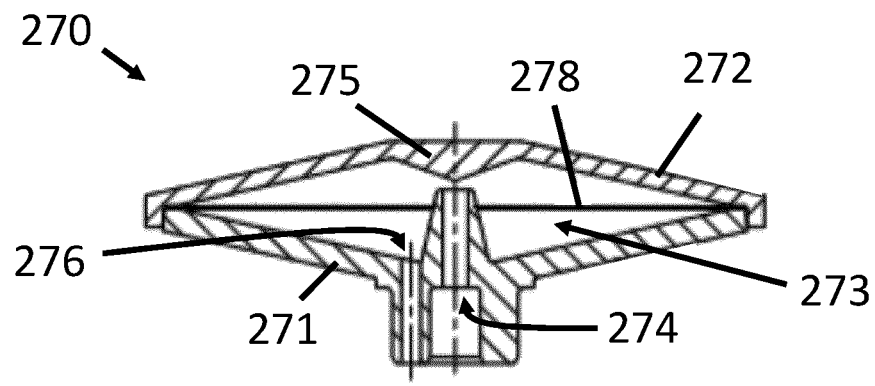
FIG. 10 shows a schematic illustration of a filter receptacle and filter of the apparatus of FIG. 1.
Figure 11:
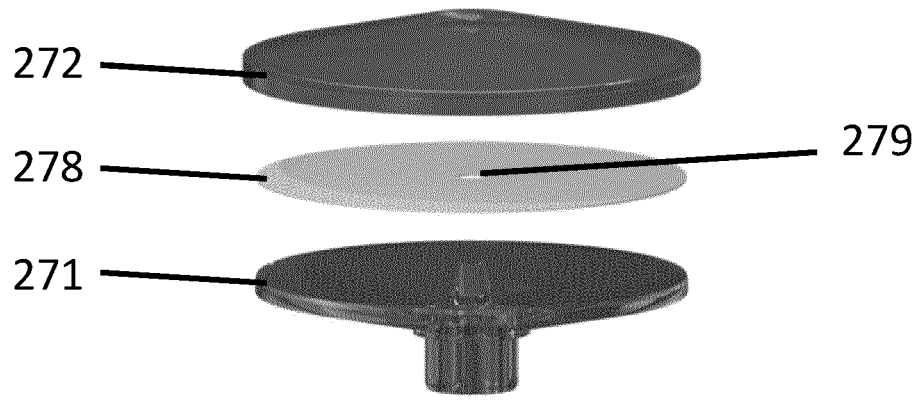
FIG. 11 shows an exploded view of the filter receptacle of FIG. 10.

In this embodiment, each conduit comprises a filter receptacle arranged between the inlet end and the outlet end of the conduit, specifically between the outlet of the display section and the outlet of the conduit. A filter receptacle is arranged at the output of the conduits of each of the first and second assessment sections 100, 200. The filter receptacle 170 of the first assessment section 100 is identical to the filter receptacle 270 of the second assessment section 200, and so only the display section 270 of the second assessment section 200 is described here, and shown in FIGS. 10 and 11.

The filter receptacle 270 of the second assessment section 200 comprises a funnel shaped base 271 and a lid 272. The lid 272 is removably securable over the base 271 to define a cavity 273 for receiving a filter between the base 271 and the lid 272. The interface between the base 271 and the lid 272 is substantially impermeable to gas, such that gases in the chamber 273 are substantially prevented from escaping the chamber 273 through the interface. In this embodiment, the lid 272 is removably secured to the base 271 by an interference fit.

An inlet 274 is provided centrally in the base 271, and extends upwards into the chamber 273 in a conical nozzle. The lid 272 is angled or shaped 275 directly above the inlet 274, to direct gas entering the chamber 273 through the inlet 274 outwards, towards the periphery of the chamber 273. An outlet 276 is also provided in the base 271, radially spaced or offset from the central inlet 274.

A Cambridge filter pad 278 is received within the chamber 273 of the receptacle 270. The Cambridge filter pad 278 is an annular glass fibre filter pad having an outer diameter of about 45 millimetres. The Cambridge filter pad 278 is arranged in the chamber 273 with the nozzle of the inlet 274 extending through a central hole 279 in the annular filter pad. The outer periphery of the filter pad 278 is trapped between the periphery of the base 271 and the lid 272. The filter pad 278 effectively divides the chamber 273 into an upper chamber above the filter pad, between the filter pad 278 and the lid 271, and a lower chamber below the filter pad, between the filter pad 278 and the base 271. In this arrangement, the output from the smoking article 202 enters the chamber 273 above the filter pad 278 in the upper half of the chamber 273, and the output is required to flow through the filter pad 278 to the lower half of the chamber 273 to reach the outlet 276. This arrangement enables the filter pad 278 to trap a high percentage of the particulate phase compounds present in the outlet.

A pump is arranged at the output of the filter receptacle of each of the first and second assessment sections 100, 200. The pump 180 of the first assessment section 100 is identical to the pump 280 of the second assessment section 200. In this embodiment, both pumps 180, 280 comprise identical piston pumps (not shown), arranged side by side in the housing of the apparatus. The piston pumps are standard piston pumps, which are well known in smoking machines, and so will not be described in detail here. Each piston pump comprises a syringe and a piston arranged within the syringe and forming an interference fit with the syringe. An electric motor is arranged to drive the piston linearly within the syringe to alternatingly draw air into the syringe at a front end and push air out of the syringe at the front end. A window may be provided in the housing 2 of the apparatus 1 directly above the piston pumps, so that an observer may view the pumps in operation.

The apparatus 1 further comprises a controller (not shown), a lithium iron phosphate battery (not shown), and an external connector (not shown) for connecting the apparatus to an external power supply.

Each assessment section 100, 200 further comprises a user interface in the form of a display. The first assessment section 100 comprises a first display 190 arranged at the side of the apparatus 1 adjacent to the first assessment section 100. The second assessment section 200 comprises a second display 290 arranged at the side of the apparatus 1 adjacent to the second assessment section 200.

The controller is configured to control the supply of power to the interface 120, the lighter 220, the pumps 180, 280, and the displays 190, 290. The supply of power to the components of the apparatus is provided from the battery, provided that the battery has sufficient charge. The external connector is provided for recharging the battery and for providing power to the components of the apparatus when the battery does not have sufficient charge. The controller is also connected to the air quality sensors 152, 252 and configured to supply power to the sensors and receive signals from the sensors including air quality readings. The controller is configured to process the received signals from the air quality sensors 152, 252 and to send the received air quality readings to the displays 190, 290 to display the air quality readings.

A power button 4 is provided at one side of the housing for starting and stopping operation of the apparatus. When a user presses the power button 4, the controller is configured to supply power to the interface 120, the lighter 120 and the pumps 180, 280, after a delay of 2 or 3 seconds to enable the lighter and the aerosol-generating article to reach the necessary operating temperature. The controller is configured to provide a predetermined number of puffs to both assessment sections before stopping the supply of power to the interface 120, the lighter 120 and the pumps 180, 280. However, the controller is configured to stop the supply of power early if a user presses the power button 4 before the end of the puffing regime.

To prepare the first assessment section 100 for use, a user: removes the cover 140 from the first assessment section 100; moves the interface 120 into the disengaged position; inserts the distal end of an aerosol-generating article 102 into the cavity at the proximal end of an aerosol-generating device 104; arranges the aerosol-generating device 104 on the holders 108; inserts the mouth end of the aerosol-generating article 102 into the labyrinth seal at the inlet end 110 of the conduit 112; moves the interface 120 from the disengaged position to the engaged position and replaces and secures the cover 140 over the holder section. A user also positions a new filter pad in the filter receptacle 170.

To prepare the second assessment section 200 for use, a user: removes the cover 240 from the second assessment section 200; moves the lighter 220 into the disengaged position; inserts the mouth end of the smoking article 202 into the labyrinth seal at the inlet end 210 of the conduit 212; moves the lighter 220 from the disengaged position to the engaged position and replaces and secures the cover 240 over the holder section. A user also positions a new filter pad 278 in the filter receptacle 270.

To start operation of the apparatus, a user presses the power button 4. On pressing the power button 4: the controller sends a single to the interface 120 to instruct the aerosol-generating device 104 to heat the aerosol-generating article 102; simultaneously, the controller supplies power to the lighter 220, to ignite the smoking article 202; and, after a delay of two seconds, the controller supplies power to the pumps 180, 280, to operate the pumps 180, 280 simultaneously. The controller is configured to drive the pumps 180, 280 according to a predetermined puffing regime, for a predetermined number of puffs. As the pumps 180, 280 draw air through the aerosol-generating article 104 and the smoking article 202, mainstream output is drawn into the conduits 112, 212, through the display sections 160, 260 and through the filter receptacles 170, 270. During operation of the apparatus, an observer can visually compare the outputs of the aerosol-generating article 102 and the smoking article 202 as they are drawn through the airflow pathways of the first and second assessment sections 100, 200. An observer can also compare the volume of particulate phase compounds trapped in the filter pads in the filter receptacles 170, 270. The controller is further configured to supply power to the air quality sensors 152, 252 in the chambers 142, 242 of the first and second assessment sections 100, 200, and to receive signals from the air quality sensors 152, 252. The controller is configured to process the signals received from the air quality sensors 152, 252 to determine air quality readings and send a signal to the displays 190, 290 to display the air quality readings during operation of the apparatus. This enables an observer to compare the sidestream outputs of the aerosol-generating article 102 and the smoking article 202 in the chambers 142, 242.

It will be appreciated that the above described embodiments are exemplary embodiments of the invention only. It will also be appreciated that features described above in relation to one embodiment of the invention may also be applied to other embodiments of the invention.

In this embodiment, the interface 120, lighter 220 and the lid of the ashtray 230 are manually movable by a user. However, it will be appreciated that in other embodiments, one or more of the interface 120, the lighter 220 and the lid of the ashtray 230 may be provided with an actuator for moving the component. The actuators may be controlled by the controller, and the controller may be configured to move the interface 120, lighter 220 and lid of the ashtray 230 at predetermined times during operation of the apparatus. For example, the controller may be configured to move the interface 120 and the lighter 220 from the disengaged position to the engaged position.

In this embodiment, the first assessment section 100 is configured to receive an aerosol-generating system and the second embodiment 200 is configured to receive a smoking article. However, it will be appreciated that in other embodiments both assessment sections may be configured to receive an aerosol-generating system or both assessment sections may be configured to receive a smoking article. In some embodiments, the apparatus may comprise at least one additional assessment section.

It will be appreciated that in some embodiments, the apparatus may be provided with one or more light sources for illuminating parts or sections of the airflow pathways. For example, the apparatus may be provided with one or more light emitting diodes for illuminating the display sections of the conduits and the upper face of the filter pads in the filter receptacles. This may improve the visibility of the output in the conduits and the particulate matter trapped by the filter pads.

The invention claimed is:

1. An apparatus, comprising:
 a housing;
 a first assessment section defining a first airflow pathway and comprising:
  a first conduit comprising an inlet end and an outlet end, the inlet end being configured to receive a mouth end of an aerosol-generating system or a smoking article,
  a first pump in fluid communication with the outlet end of the first conduit and configured to draw fluid through the first conduit, from the inlet end to the outlet end, and
  a first cover arranged on the housing, the first cover and the housing together forming a first chamber, the first chamber enclosing at least the inlet end of the first conduit and the aerosol-generating system or the smoking article received in the inlet end of the first conduit; and
 a second assessment section defining a second airflow pathway and comprising:
  a second conduit comprising an inlet end and an outlet end, the inlet end being configured to receive a mouth end of an aerosol-generating device or a smoking article,
  a second pump in fluid communication with the outlet end of the second conduit and configured to draw fluid through the second conduit from the inlet end to the outlet end, and
  a second cover arranged on the housing, the second cover and the housing together forming a second chamber, the second chamber enclosing the inlet end of the second conduit and the aerosol-generating device or the smoking article received in the inlet end of the second conduit.

2. The apparatus according to claim 1, further comprising:
 a first air quality sensor configured to sense air quality in the first chamber; and
 a second air quality sensor configured to sense air quality in the second chamber.

3. The apparatus according to claim 2, wherein each of the first and the second air quality sensors is configured to sense one or more of: carbon monoxide, volatile organic compounds, relative humidity and temperature, carbon dioxide, fine particulate matter, nitrogen dioxide, dioxygen, and pressure.

4. The apparatus according to claim 2, wherein each of the first and the second quality sensors comprises at least one of: an electrochemical sensor, a chemical resistive sensor, a Metal Oxide Semiconductor (MOS) sensor, a catalytic sensor, and a gas spectrometer.

5. The apparatus according to claim 2,
 further comprising circuitry connected to the first and the second air quality sensors, and a user interface connected to the circuitry,
 wherein the circuitry is configured to receive data from the first and the second air quality sensors, process the data, and send the processed data to the user interface.

6. The apparatus according to claim 1,
 wherein the first conduit further comprises a first filter receptacle arranged between the first conduit and the first pump, the first filter receptacle comprising an inlet in fluid communication with the inlet end of the first conduit, an outlet in fluid communication with the outlet end of the first conduit, and a cavity configured to receive a filter arranged between the inlet and outlet, and
 wherein the second conduit further comprises a second filter receptacle arranged between the inlet end and the outlet end, the second filter receptacle comprising an inlet in fluid communication with the inlet end of the second conduit, an outlet in fluid communication with the outlet end of the second conduit, and a cavity configured to receive a filter arranged between the inlet and outlet.

7. The apparatus according to claim 1,
wherein the first assessment section is configured to receive the aerosol-generating system comprising an aerosol-generating article and an aerosol-generating device configured to receive the aerosol-generating article,
wherein the first assessment section further comprises a holder configured to hold the aerosol-generating device, and
wherein the inlet end of the first conduit is further configured to receive a mouth end of the aerosol-generating article received in the aerosol-generating device received in the holder.

8. The apparatus according to claim 7,
wherein the first assessment section further comprises an interface configured to couple to the aerosol-generating device received in the holder, and
wherein the interface is configured to transfer one or more of power and data to the aerosol-generating device held in the holder.

9. The apparatus according to claim 1,
wherein the second assessment section is configured to receive the smoking article, and
wherein the inlet end of the second conduit is configured to receive the mouth end of the smoking article.

10. The apparatus according to claim 9, wherein the second assessment section further comprises a lighter.

11. The apparatus according to claim 10,
wherein the first assessment section is configured to receive the aerosol-generating system comprising an aerosol-generating article and an aerosol-generating device configured to receive the aerosol-generating article,
wherein the first assessment section further comprises a holder configured to hold the aerosol-generating device,
wherein the inlet end of the first conduit is further configured to receive a mouth end of the aerosol-generating article received in the aerosol-generating device received in the holder
wherein the first assessment section further comprises an interface configured to couple to the aerosol-generating device received in the holder, and
wherein the interface is configured to transfer one or more of power and data to the aerosol-generating device held in the holder,
the apparatus further comprising heater control circuitry configured to:
supply a signal to the aerosol-generating device coupled to the interface of the first assessment section to activate the aerosol-generating device to heat the aerosol-generating article received in the aerosol-generating device, and
supply power to the lighter of the second assessment section configured to heat a distal end of the smoking article received in the inlet end of the second conduit.

12. The apparatus according to claim 9, wherein the second assessment section further comprises an ashtray arranged in the second chamber, adjacent the inlet end of the second conduit, below the smoking article received in the inlet end of the second conduit.

13. The apparatus according to claim 1, further comprising pump control circuitry configured to:
supply power to the first pump;
supply power to the second pump; and
control a supply of power to the first and the second pumps such that the first and the second pumps operate substantially simultaneously to draw air through the first and the second airflow pathways in a plurality of substantially simultaneous puffs.

14. The apparatus according to claim 1,
wherein the first chamber comprises a first outlet in at least one of the first cover and the housing and at least one filter is arranged between the first outlet and an ambient environment, and
wherein the second chamber comprises a second outlet in at least one of the second cover and the housing and at least one filter is arranged between the second outlet and the ambient environment.

15. The apparatus according to claim 1, wherein at least one of the first and the second covers and the first and the second conduits are substantially formed from a transparent material.

* * * * *